US009646416B2

(12) United States Patent
Kishikawa et al.

(10) Patent No.: US 9,646,416 B2
(45) Date of Patent: May 9, 2017

(54) THREE-DIMENSIONAL MAP DISPLAY SYSTEM

(71) Applicant: GEO TECHINICAL LABORATORY CO., LTD., Fukuoka-shi, Fukuoka (JP)

(72) Inventors: Kiyonari Kishikawa, Fukuoka (JP); Eiji Teshima, Fukuoka (JP); Masatoshi Aramaki, Fukuoka (JP); Masashi Uchinoumi, Fukuoka (JP); Masaru Nakagami, Fukuoka (JP); Tatsuya Azakami, Fukuoka (JP); Tatsurou Yonekura, Fukuoka (JP)

(73) Assignee: GEO TECHNICAL LABORATORY CO., LTD., Fukuoka-shi (JP)

( * ) Notice: Subject to any disclaimer, the term of this patent is extended or adjusted under 35 U.S.C. 154(b) by 0 days.

(21) Appl. No.: 14/860,597

(22) Filed: Sep. 21, 2015

(65) Prior Publication Data
US 2016/0012635 A1    Jan. 14, 2016

Related U.S. Application Data

(63) Continuation of application No. PCT/JP2014/001325, filed on Mar. 10, 2014.

(30) Foreign Application Priority Data

Mar. 25, 2013 (JP) ................................ 2013-061217

(51) Int. Cl.
G06T 15/60    (2006.01)
G06T 17/05    (2011.01)
(Continued)

(52) U.S. Cl.
CPC .............. *G06T 17/05* (2013.01); *G06T 7/507* (2017.01); *G06T 7/536* (2017.01); *G06T 7/64* (2017.01);
(Continued)

(58) Field of Classification Search
None
See application file for complete search history.

(56) References Cited

U.S. PATENT DOCUMENTS

| 2012/0062566 | A1* | 3/2012 | Kuhne | G09B 29/006 345/426 |
| 2013/0135345 | A1* | 5/2013 | Pallett | G01C 21/3484 345/629 |
| 2014/0184591 | A1* | 7/2014 | Boschker | G06T 15/50 345/419 |

FOREIGN PATENT DOCUMENTS

| JP | 9-6941 | 1/1997 |
| JP | 10-91760 | 4/1998 |
| JP | 2006-126445 | 5/2006 |

OTHER PUBLICATIONS

Search Report dated Jun. 3, 2014 from International Application No. PCT/JP2014/001325.

(Continued)

Primary Examiner — Yingchun He
(74) Attorney, Agent, or Firm — Beyer Law Group LLP

(57) ABSTRACT

A three-dimensional map is displayed in a bird's eye view with a stereoscopic effect of feature polygons by providing shading in an appropriate direction according to the gaze direction in a simulative manner. Shading wall polygons are set in addition to feature polygons in three-dimensional map data. The shading wall polygon is a virtual plate-like polygon provided vertically, for example, along a boundary of a feature polygon. When provided around the water system, the shading wall polygon is specified to be opaque on one surface viewed from the water system side and to be transparent on the opposite surface. The shading wall polygons are drawn along with the feature polygons in the process of displaying a map. The shading wall polygon is (Continued)

drawn in black, gray or the like only at a location where the surface specified to be opaque faces a gaze direction.

12 Claims, 8 Drawing Sheets

(51) Int. Cl.

| | | |
|---|---|---|
| *G06T 7/00* | (2017.01) | |
| *G06T 15/50* | (2011.01) | |
| *G09B 29/12* | (2006.01) | |
| *G09B 29/00* | (2006.01) | |
| *G06T 15/20* | (2011.01) | |
| *G06T 19/20* | (2011.01) | |
| *G06T 7/507* | (2017.01) | |
| *G06T 7/536* | (2017.01) | |
| *G06T 7/64* | (2017.01) | |

(52) U.S. Cl.
CPC ............ *G06T 15/20* (2013.01); *G06T 15/503* (2013.01); *G06T 15/60* (2013.01); *G06T 19/20* (2013.01); *G09B 29/005* (2013.01); *G09B 29/12* (2013.01); *G06T 2200/04* (2013.01); *G06T 2207/30184* (2013.01); *G06T 2207/30188* (2013.01); *G06T 2210/36* (2013.01); *G06T 2210/61* (2013.01); *G06T 2210/62* (2013.01)

(56) References Cited

OTHER PUBLICATIONS

European Search Report dated Nov. 2, 2016 from European Application No. 14774550.

\* cited by examiner

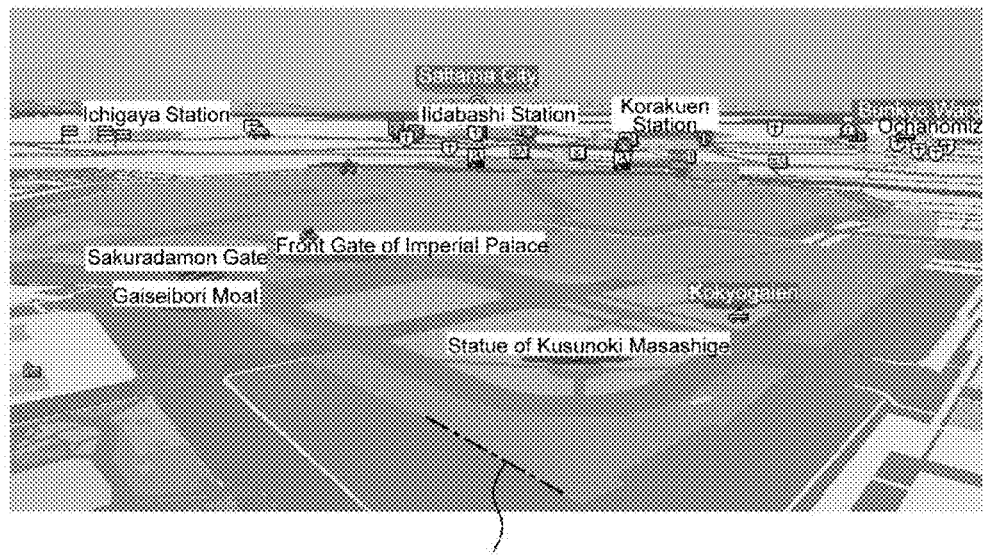
Fig. 1A  Boundary
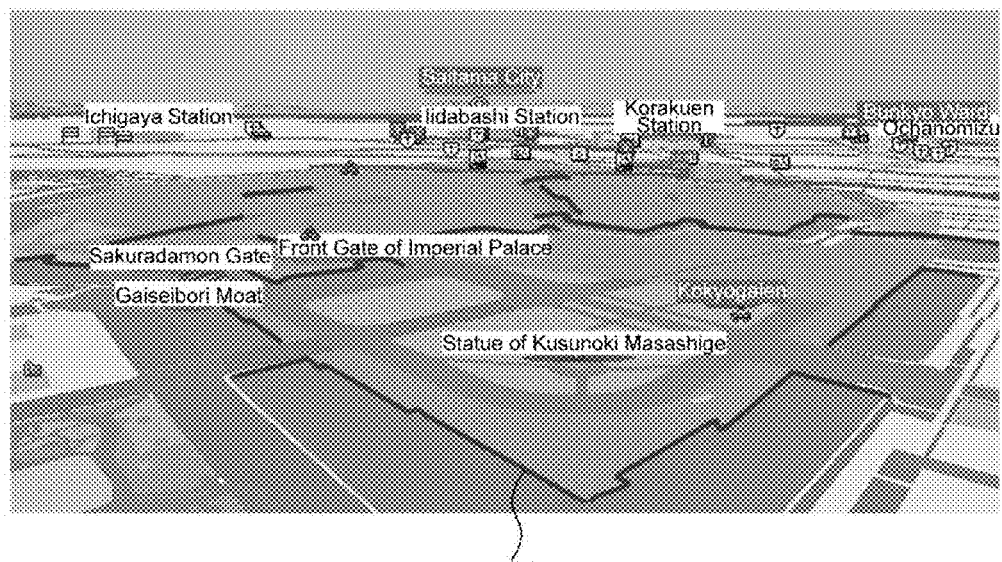
Fig. 1B  Boundary

THREE-DIMENSIONAL MAP DISPLAY SYSTEM

CLAIM OF PRIORITY

This application is a Continuation of International Patent Application No. PCT/JP2014/001325, filed on Mar. 10, 2014, which claims priority to Japanese Patent Application No. 2013-061217, filed on Mar. 25, 2013, each of which is hereby incorporated by reference.

BACKGROUND OF THE INVENTION

1. Field of the Invention

The present invention relates to a three-dimensional map display system that displays a three-dimensional map in a bird's eye view.

2. Description of the Related Art

An electronic map displayed on the screen of, for example, a navigation system or a computer may be a three-dimensional map that expresses features such as buildings three-dimensionally. The three-dimensional map is generally displayed by three-dimensionally drawing three-dimensional models by, for example, perspective projection. The three-dimensional map drawn in the bird's eye view by looking down from the upper viewpoint position is capable of displaying a wide area with perspective and thereby has high availability.

The three-dimensional map advantageously enables the user to intuitively understand the geography. Improvement in reality is desired to utilize this advantage. From this point of view, it has been attempted to give perspective to features in the three-dimensional map. For example, Japanese Patent Laid-Open Application No. JP 2006-126445A discloses a technique of specifying the position of the sun shade a three-dimensional model.

BRIEF DESCRIPTION OF THE INVENTION

It is, however, not easy to shade the three-dimensional map. For example, the technique of Patent Literature 1 requires a heavy processing load for calculation of shading relative to the estimated position of the sun. In some cases, the vertical relationship of polygons representing features differs from the actual relationship. For example, a polygon representing the water system such as pond or river may be drawn in an overlapped configuration over a polygon representing the ground surface. The ground surface which is located at the higher position than the water system in the actual height relationship is present below the water system in the polygon configuration. In this state, it is difficult to provide adequate shading on the assumption of the position of the sun. By taking into account the above problems, an object of the invention is to provide shading in display of a three-dimensional map, while avoiding an extreme increase in processing load.

According to one embodiment of the invention, there is provided a three-dimensional map display system that displays a three-dimensional map, comprising: a drawing map database that is used to draw the three-dimensional map; and a display controller that refers to the drawing map database and displays the three-dimensional map as a bird's eye view from a viewpoint position looking down from a height and in a gaze direction. The drawing map database stores: feature polygon data used to draw feature polygons representing shapes of features to be drawn in the three-dimensional map; and shading wall polygon data used to display a shading wall polygon, which is a virtual plate-like polygon to express shading in the three-dimensional map, is set perpendicular to or inclined to a feature polygon for which the plate-like polygon is to be set, and is specified to be visible only from one surface of front and rear surfaces and to be transparent from the other surface. The display controller displays only the surface specified to be visible with respect to the shading wall polygon.

One embodiment of the invention provides virtual shading wall polygons and draws the shading wall polygons to shade features. Shading herein does not denote shadow on the ground surface but denotes shade generated by the presence of a surface perpendicular to or inclined to the surface of a feature, such as a level difference of a feature.

FIGS. 1A and 1B are diagrams illustrating an example of shading. FIG. 1A illustrates a display example of a three-dimensional map in the state without shading. In this example, the boundary between the ground surface and the water system is displayed as if the ground surface and the water system are present on an identical plane as illustrated. FIG. 1B illustrates an example that uses shading wall polygons to provide shading. In this example, the shading wall polygons are plate-like polygons set up vertically along the boundary in FIG. 1A to be visible when viewed from the front side of the viewpoint. Accordingly, in display of a three-dimensional map, shading is drawn along the boundary like black rims. This provides the three-dimensional map with the stereoscopic effect. The process required for such display merely increases the drawing objects by the shading wall polygons and does not cause an extreme increase in processing load.

Shading as illustrated in FIGS. 1A and 1B may also be expressed, for example, by drawing a thick line along the boundary of a polygon. The invention in accordance with one embodiment thereof, however, uses the shading wall polygons, which has the following advantages. The shading wall polygon is set to be visible only from one surface of the front and rear surfaces. For example, in FIG. 1B, even when shading wall polygons are set to surround the water system, the parts on the side close to the viewpoint are not displayed. This avoids a feature which is to be displayed from being hidden by the shading wall polygon and enables natural shading to be provided according to the gaze direction.

In the process of drawing a three-dimensional map, like other features, the sense of perspective is given to shading wall polygons. This decreases the drawing size of the shading wall polygon with an increase in distance from the viewpoint without any special processing. In FIGS. 1A and 1B, the shading wall polygons are hardly visible at a great distance. The method using the shading wall polygons has the advantage of readily providing natural shading, compared with the method of simply drawing thick lines along the boundary of a polygon.

The illustration of FIGS. 1A and 1B are only an example. For example, the shading wall polygons are not limitedly provided on the boundary of a polygon like FIGS. 1A and 1B but may be provided at a variety of locations including inside of the polygon. A variety of settings are allowed for the color of the surface of a shading wall polygon specified to be visible. As the expression appropriate for shading, the color may be black or gray. A color having the similar hue but the lower lightness than the color of a polygon present in the vicinity may be used according to the location where the shading wall polygon is set. A texture may be added to the shading wall polygon.

A shading wall polygon is perpendicular to or inclined to the surface of a feature polygon for which the shading wall polygon is set. When the shading wall polygon is set for the substantially horizontal ground surface or water system like FIGS. 1A and 1B, the shading wall polygon is set in the vertical direction or in an oblique direction. For example, when a shading wall polygon is set in the vicinity of a window polygon or a window texture attached to a feature polygon representing a vertical plane, such as a window of a building, the shading wall polygon forms a substantially horizontal or inclined plane like a window roof.

A variety of methods are available to display only one surface of the shading wall polygon. For example, a surface to be displayed and a surface to be transparent of a shading wall polygon are made identifiable by a method of setting flags to the surface to be displayed and the surface to be transparent or by a method of identifying the front surface and the rear surface according to the normal vector of a polygon. The control is then made not to draw the surface to be transparent in display. In this application, the display controller may be configured not to draw the rear surface of a polygon as the standard process.

According to another application, the display controller may be configured to draw both the front surface and the rear surface of a polygon and specify a transparent color for the surface to be transparent of a shading wall polygon.

According to an aspect of the invention, the shading wall polygon may be set at a boundary position of the feature polygon. In many cases, shading appears on the boundary of polygons. The shading wall polygon of the invention is highly effective when set at the boundary position.

In the above aspect, the feature polygons may include feature polygons which are drawn in an overlapped configuration according to a vertical relationship that is reverse to an actual height relationship, and the shading wall polygon may be set at a boundary of an upper feature polygon in the overlapped configuration and is specified to be visible on a side facing the upper feature polygon.

For example, the water system illustrated in FIGS. 1A and 1B is expressed by drawing the water system polygon in an overlapped configuration over the ground surface polygon. More specifically, in the actual height relationship, the ground surface should be located above the water surface. The vertical relationship of the polygons, however, shows the water system polygon as the upper polygon. At such a location where the vertical relationship of the polygons is reversed to the actual height relationship, the prior art calculation on the assumption of lighting does not provide adequate shading. The invention is thus especially effective at this location.

Such reversed positional relationship is not restrictively observed between the ground surface and the water system but may occur between various polygons. Specific examples include windows provided on the side wall of a building and semi-subterranean roads and railways drawn on the ground surface.

The invention is not limited to the aspects of the three-dimensional map display system but is implemented by a variety of other aspects. For example, according to another aspect of the invention, there is provided a map data generation device that generates a drawing map database used to display a three-dimensional map, comprising: an original map database that stores feature polygon data used to draw feature polygons representing shapes of features to be displayed in the three-dimensional map; and a shading wall polygon generator that generates a virtual shading wall polygon to express shading in the three-dimensional map. The shading wall polygon generator is configured to: extract a boundary of a feature polygon stored in the original map database; generate a virtual plate-like shading wall polygon to be vertical to or inclined to the boundary, in such a state that the shading wall polygon is visible from only one surface of front and rear surfaces but is transparent from the other surface; and store the generated shading wall polygon into the drawing map database.

The map data generation device in accordance with one embodiment of the invention enables the shading wall polygon to be efficiently set at the boundary of the feature polygon. The feature polygon for which the shading wall polygon is to be set may be specified, for example, by the operator or may be selected according to the type of the feature polygon.

Which of the surfaces of the shading wall polygon is to be made visible may also be specified by the operator or may be determined according to the shape of the shading wall polygon or the type of the feature polygon for which the shading wall polygon is set. In the latter case, for example, when a shading wall polygon is set to surround a feature polygon, the inside of the shading wall polygon may be specified to be visible.

According to one aspect of the map data generation device, the feature polygons may include feature polygons which are drawn in an overlapped configuration according to a vertical relationship that is reverse to an actual height relationship, and the shading wall polygon generator may generate the shading wall polygon in such a state that the shading wall polygon is set at a boundary of an upper feature polygon in the overlapped configuration and is specified to be visible on a side facing the upper feature polygon. This allows for efficient generation of shading wall polygons including specification of the surfaces to be visible.

The invention may not necessarily include all the variety of features described above but may be configured appropriately with partial omission or by combination of these features. The invention may also be configured as a three-dimensional map display method performed by a computer to display a three-dimensional map, a map data generation method performed by a computer to generate map data or a computer program that causes a computer to display a three-dimensional map or generate map data. The invention may also be configured as a computer-readable non-transitory storage medium in which such a computer program is stored.

When one embodiment of the invention is configured as a computer program or as a non-transitory storage medium in which such a computer program is stored, the configuration may include the entire program that controls the operations of the three-dimensional image output device or the background image generation device or may include only a section that achieves the functions of the embodiments of the invention. Available examples of the storage medium include flexible disks, CD-ROMs, DVD-ROMs, magneto-optical disks, IC cards, ROM cartridges, punched cards, prints with barcodes or other codes printed thereon, internal storage units (memories such as RAM and ROM) and external storage units of computers and various other computer-readable media.

BRIEF DESCRIPTION OF THE DRAWINGS

FIG. 1A is diagrams illustrating an example of shading;
FIG. 1B is diagrams illustrating an example of shading.

DETAILED DESCRIPTION OF EMBODIMENTS OF THE INVENTION

Embodiment 1

A. System Configuration

Figure 2:
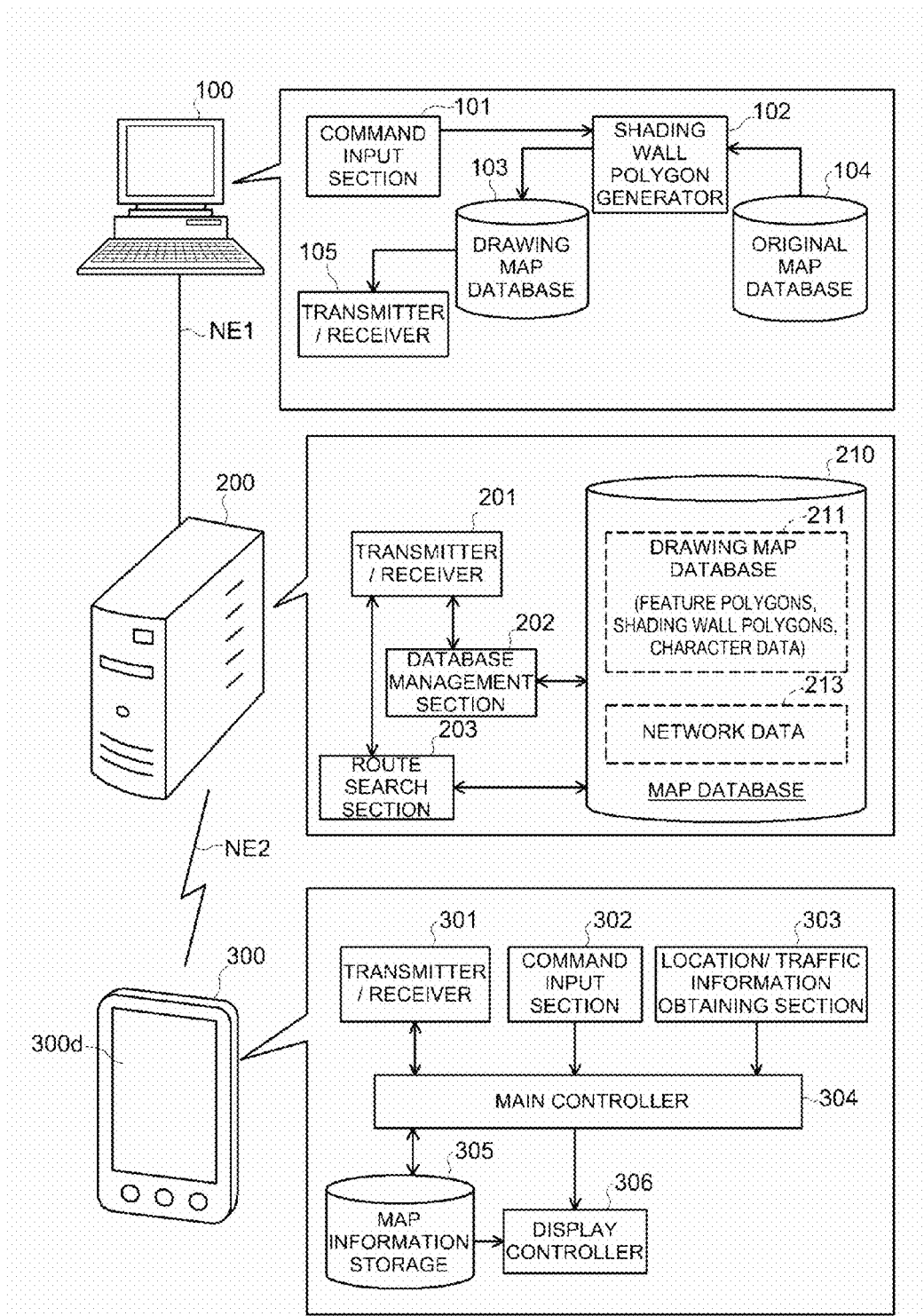
FIG. 2 is a diagram illustrating the configuration of a three-dimensional map display system.

FIG. 2 is a diagram illustrating the configuration of a three-dimensional map display system. The three-dimensional map display system of the embodiment is a system configured to search a route and guide the route while displaying a three-dimensional map. The three-dimensional map display system may otherwise be configured as a system that does not have the route search and route guidance functions but simply displays a three-dimensional map in response to the user's instructions. The three-dimensional map display system utilizes shading wall polygons to shade feature polygons and allow for display with the stereoscopic effect as described above with reference to FIG. 1B.

The three-dimensional map display system of the embodiment is configured by connecting a server 200 with a terminal 300 by means of a network NE2. The terminal 300 used herein is a smartphone, but any of variety of devices that are capable of displaying a map, such as a cell phone, a personal digital assistance or a personal computer may also be used as the terminal 300.

FIG. 2 also illustrates a map data generation device 100 that generates map data. The map data generation device 100 is implemented by a personal computer including a CPU, a RAM and a ROM and is configured as a device to generate a drawing map database from an original map database 104. The map data generation device 100 is connected with the server 200 by means of a network NE1, and the generated drawing map database is stored in the server 200.

The map data generation device 100, the server 200 and the terminal 300 respectively include functional blocks as illustrated. These functional blocks are configured as software configuration by installing computer programs for implementing the respective functions according to this embodiment, but may be configured as hardware configuration. The functions respectively implemented by the map data generation device 100, the server 200 and the terminal 300 of the embodiment are only illustrative. For example, all these functions may be implemented by a single standalone device. As another example, these functions may be implemented by a distribution system including a greater number of servers than that of the illustrated example.

The following describes the configurations of the respective devices.

(1) Map Data Generation Device 100

An original map database 104 is configured as a database to store feature polygon data representing, for example, the shapes of features to be drawn in a map and line data. According to the embodiment, three-dimensional map data representing three-dimensional shapes are stored in the original map database 104. The data stored in the original map database 104 may be used directly to draw a three-dimensional map by, for example, perspective projection. According to this embodiment, in order to improve the stereoscopic effect, the map data generation device 100 processes the original map database 104 to generate a drawing map database 103.

A command input section 101 inputs the operator's instructions with regard to, for example, processing of the original map database 104. A shading wall polygon generator 102 sets shading wall polygons to shade feature polygons stored in the original map database 104. The drawing map database 103 stores drawing map data generated by applying the shading wall polygons generated by the shading wall polygon generator 102 to the original map database 104. A transmitter/receiver 105 sends and receives data to and from the server 200. According to the embodiment, the map data stored in the drawing map database 103 are sent by the transmitter/receiver 105 via the network NE1 to the server 200.

(2) Server 200

A map database 210 stores a drawing map database 211 and network data 213. The drawing map database 211 stores feature polygon data representing three-dimensional shapes of features and character data. The drawing map database 211 also stores the shading wall polygons generated by the map data generation device 100. The network data 213 are data for route search expressing roads by links and nodes. A database management section 202 manages input and output of data into and from the map database 210.

A route search section 203 utilizes the network data 213 to search a route from a departure place to a destination specified by the user of the terminal 300. Any of known techniques such as Dijkstra's algorithm may be applied for the route search. A transmitter/receiver 201 sends and receives various data and commands to and from the terminal 300 via the network NE2.

(3) Terminal 300

A main controller 304 consolidates and controls the operations of the respective functional blocks provided in the terminal 300. A transmitter/receiver 301 sends and receives data and commands to and from the server 200 via the network NE2. A command input section 302 inputs the user's instructions with regard to, for example, route guidance. The instructions include, for example, specification of a departure place and a destination of route guidance and specification of a display scale for displaying a map. A location/traffic information obtaining section 303 obtains the current location of the terminal 300 from a sensor such as GPS (global positioning system) and obtains information on traffic congestion and traffic restrictions via the network NE2.

A map information storage 305 temporarily stores the drawing map database 211 obtained from the server 200 in the course of displaying a map. According to this embodiment, the terminal 300 does not store in advance all the map data but appropriately obtains required map data according to the map display range from the server 200. The map information storage 305 stores the map data thus obtained, as well as the result of route search.

A display controller 306 uses the map data stored in the map information storage 305 to display a map on a display 300d of the terminal 300. The map is displayed by perspective projection from a specified viewpoint position and in a specified gaze direction. According to this embodiment, a graphics library is used for the display controller 306 to draw only polygons having normal vectors facing the gaze direction.

B. Examples of Setting Shading Wall Polygons

The embodiment uses shading wall polygons to shade feature polygons. The shading wall polygon is a virtual plate-like polygon visible from only one surface. The following shows examples of shading wall polygons.

Figure 3:
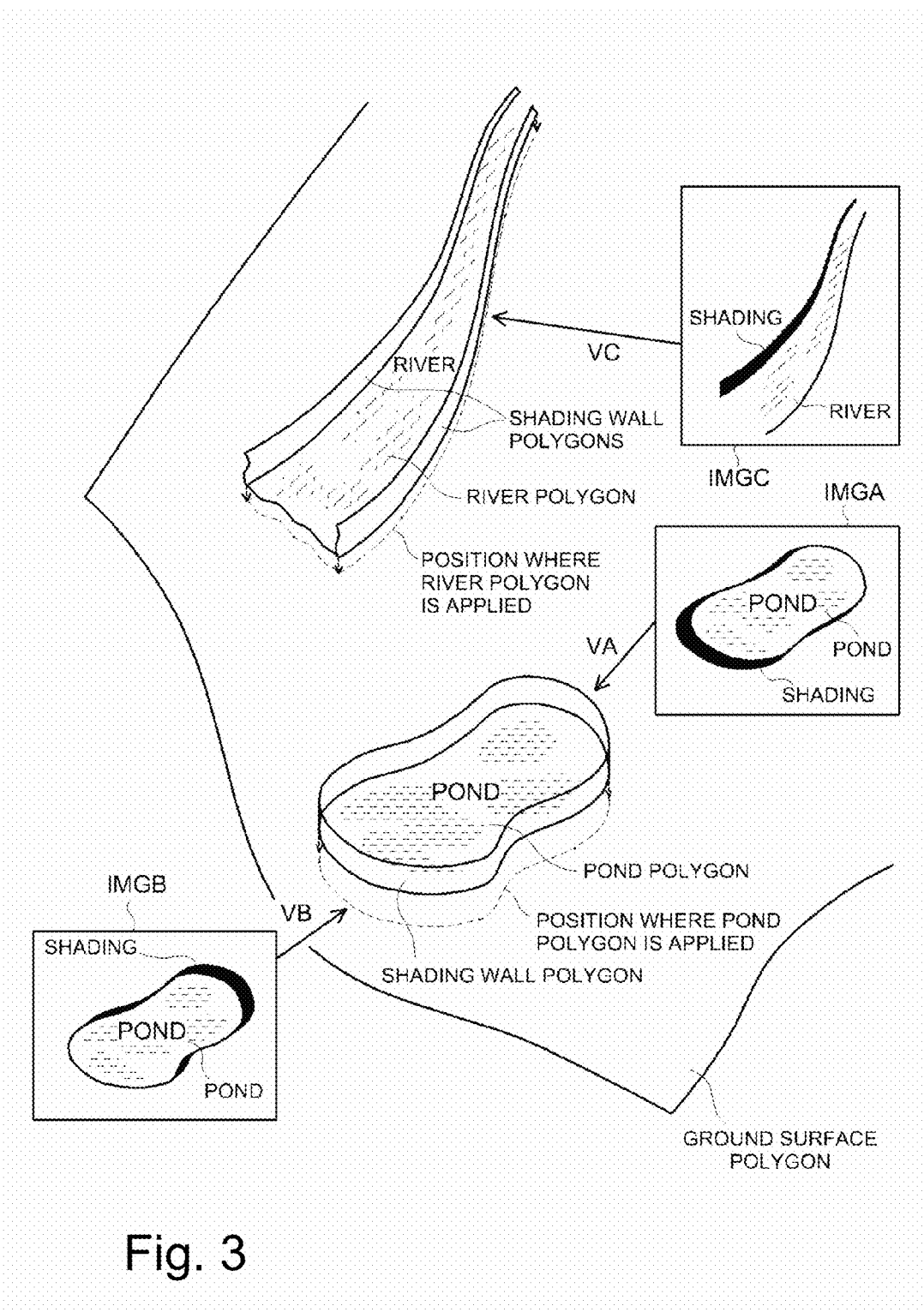
FIG. 3 is a diagram illustrating an example of setting shading wall polygons.

FIG. 3 is a diagram illustrating an example of setting shading wall polygons. In the illustrated example, shading wall polygons are set for the water system such as river or pond. As illustrated, a river polygon representing river and a pond polygon representing pond are drawn in an overlapped configuration over the ground surface polygon. Actually the water surfaces of the river and the pond are located at the lower positions than the ground surface. In the display of a three-dimensional map, however, unlike the actual vertical relationship, the river polygon and the pond polygon are located above the ground surface. A shading wall polygon of the embodiment is set around the polygon located above the ground surface.

As shown in the lower portion of illustration, a shading wall polygon is set vertically to surround the pond polygon. The shading wall polygon is specified to be opaque when viewed from the inside, i.e., from the pond polygon side, and to be transparent when viewed from the outside. According to the embodiment, polygons are drawn only when their normal vectors face the gaze direction. The shading wall polygon is specified to be transparent as described above by setting its normal vector to face the inside of the pond.

The color of the inside of the shading wall polygon is set to a color that expresses shading, for example, black or gray. A brown color or another suitable color may be used to express the slope of the pond. A texture representing the slope may be applied on the shading wall polygon.

A projection IMGA viewed from a gaze direction VA is also illustrated. Only the inside of a shading wall polygon is visible. When viewed from the gaze direction VA, a shading wall polygon is accordingly drawn on the opposite side across the pond to shade the pond as illustrated. When viewed from a gaze direction VB, on the other hand, a shading wall polygon is drawn on the opposite side to shade the pond as illustrated in a projection IMGB. Setting the shading wall polygon around the pond in this way provides shading according to the gaze direction.

As shown in the upper portion of the illustration, shading wall polygons are set vertically to go along both sides of the river polygon. The shading wall polygons are specified to be visible when viewed from the inside, i.e., from the river polygon side, and to be transparent when viewed from the outside. The shading wall polygons are specified in this way by setting their normal vectors to respectively face the inside of the river. The color of the inside of the shading wall polygons is set to a color that expresses shading, for example, black or gray. A brown color or another suitable color may be used to express the slope of the river.

A projection IMGC viewed from a gaze direction VC is also shown in the upper right portion of the illustration. When viewed from the gaze direction VC, a shading wall polygon set on the front side of the river polygon is not drawn, while a shading wall polygon on the opposite side is drawn. Like feature polygons, each shading wall polygon is drawn by perspective projections to become thinner at the more distant and provide shading with perspective.

Figure 4A:
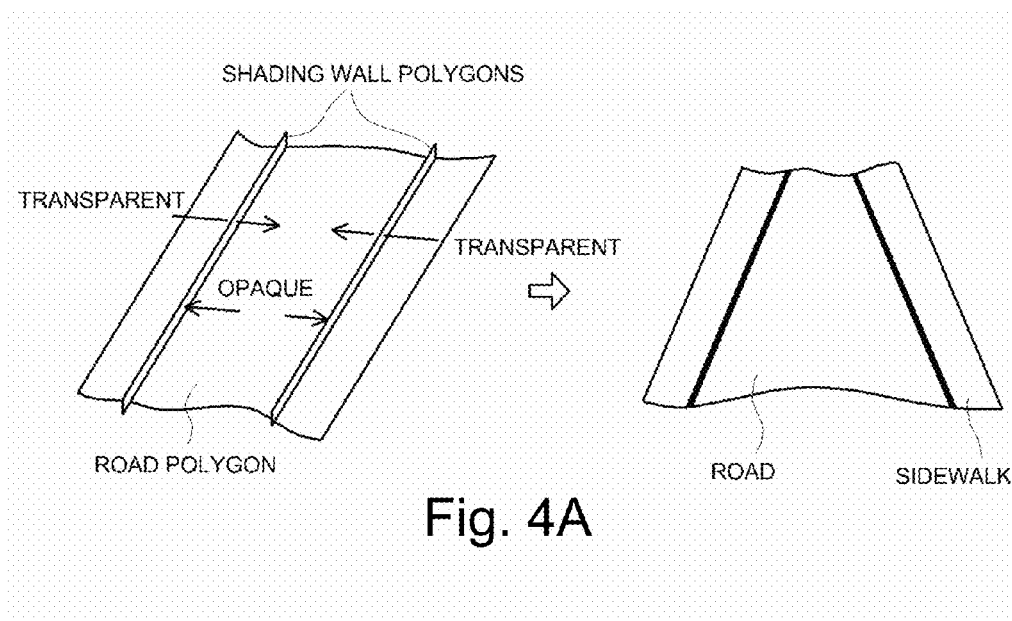
FIG. 4A is diagrams illustrating examples (2) of setting shading wall polygons.
Figure 4B:
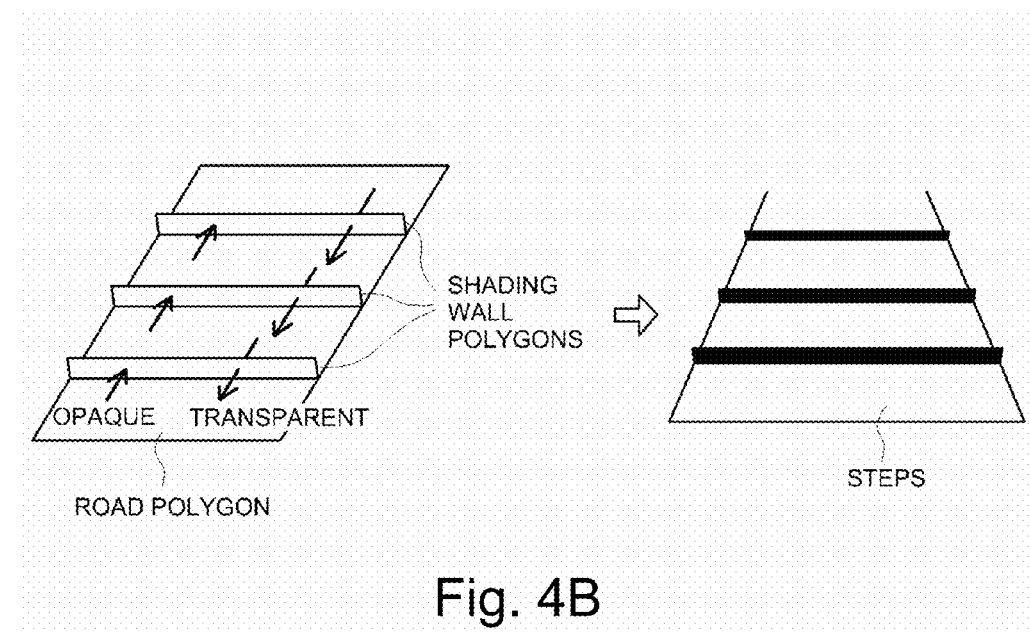
FIG. 4B is diagrams illustrating examples (2) of setting shading wall polygons.
Figure 4C:
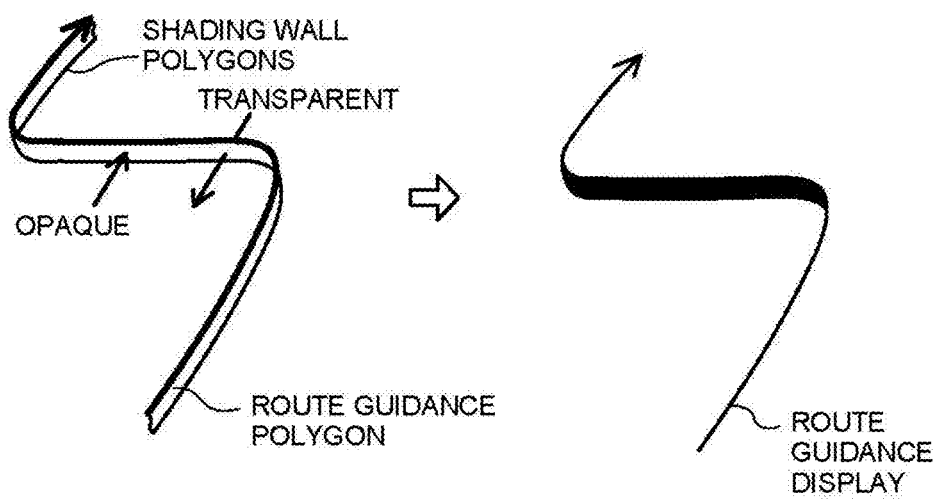
FIG. 4C is diagrams illustrating examples (2) of setting shading wall polygons.

The shading wall polygons of the embodiment are not limited to those set on the boundaries of polygons as illustrated in FIG. 3. FIGS. 4A through 4C are diagrams illustrating examples (2) of setting shading wall polygons.

FIG. 4A shows an example in which shading wall polygons are set at positions of a fixed distance from both edges along a road polygon. The shading wall polygon is specified to be opaque when viewed from the road center side, while being specified to be transparent when viewed from the edge sides. A projection of a road is illustrated on the right side of FIG. 4A. Shading is provided along shading walls when viewed from the center side. This expresses a sidewalk on both sides of the road in a simulative manner.

FIG. 4B shows an example in which several shading wall polygons are set at fixed intervals to link both edges of a road polygon with each other. The shading wall polygon is specified to be opaque when viewed from one side of the road polygon, while being specified to be transparent when viewed from the opposite side. A projection of a road is illustrated on the right side of FIG. 4B. Shading is provided at fixed intervals in the direction crossing the road. This expresses steps in a simulative manner.

FIG. 4C shows an example in which a shading wall polygon is set along a route guidance display. The route guidance display is expressed by line data as illustrated. The shading wall polygon is set vertically along and below the route guidance display. The shading wall polygon is specified to be opaque when viewed from one surface, while being specified to be transparent when viewed from the opposite surface. A projection of a route guidance display is illustrated on the right side of FIG. 4C. In this illustrated example, a shading wall polygon is specified to be opaque only in a center portion of a bend. Shading is accordingly provided in this portion. This allows for route guidance with the stereoscopic effect.

The shading wall polygons are not limited to the aspects illustrated in FIGS. 3 and 4A through 4C. The shading wall polygon may be set at any of various locations other than those described above to provide a variety of shadings.

C. Shading Wall Polygon Generating Process

The shading wall polygons are generated by the map data generation device 100. This embodiment may employ a method of the operator's manually generating shading wall polygons or a method of automatically or semi-automatically generating shading wall polygons. The following describes the process to achieve such generation.

Figure 5:
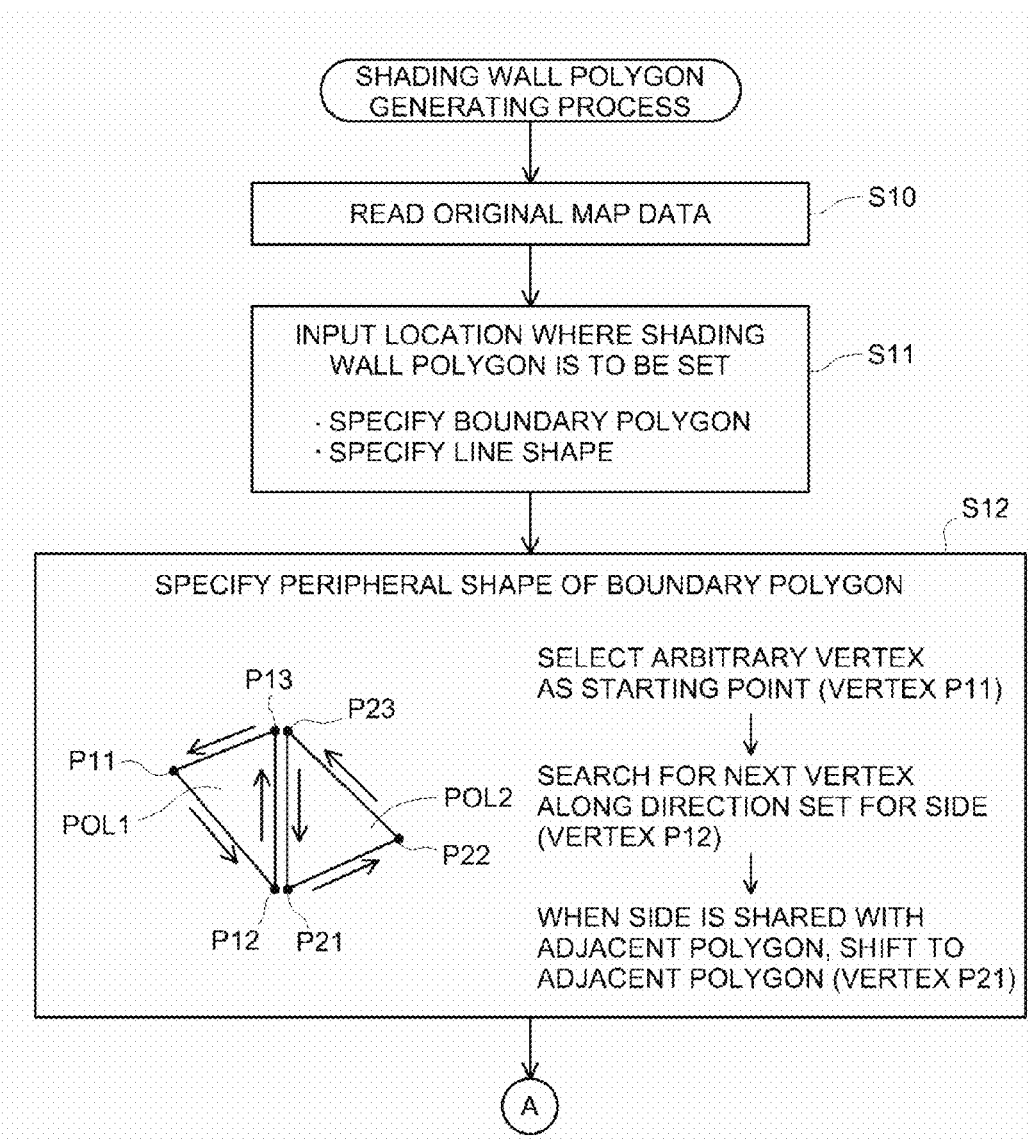
FIG. 5 is a flowchart (1) showing a shading wall polygon generating process.
Figure 6:
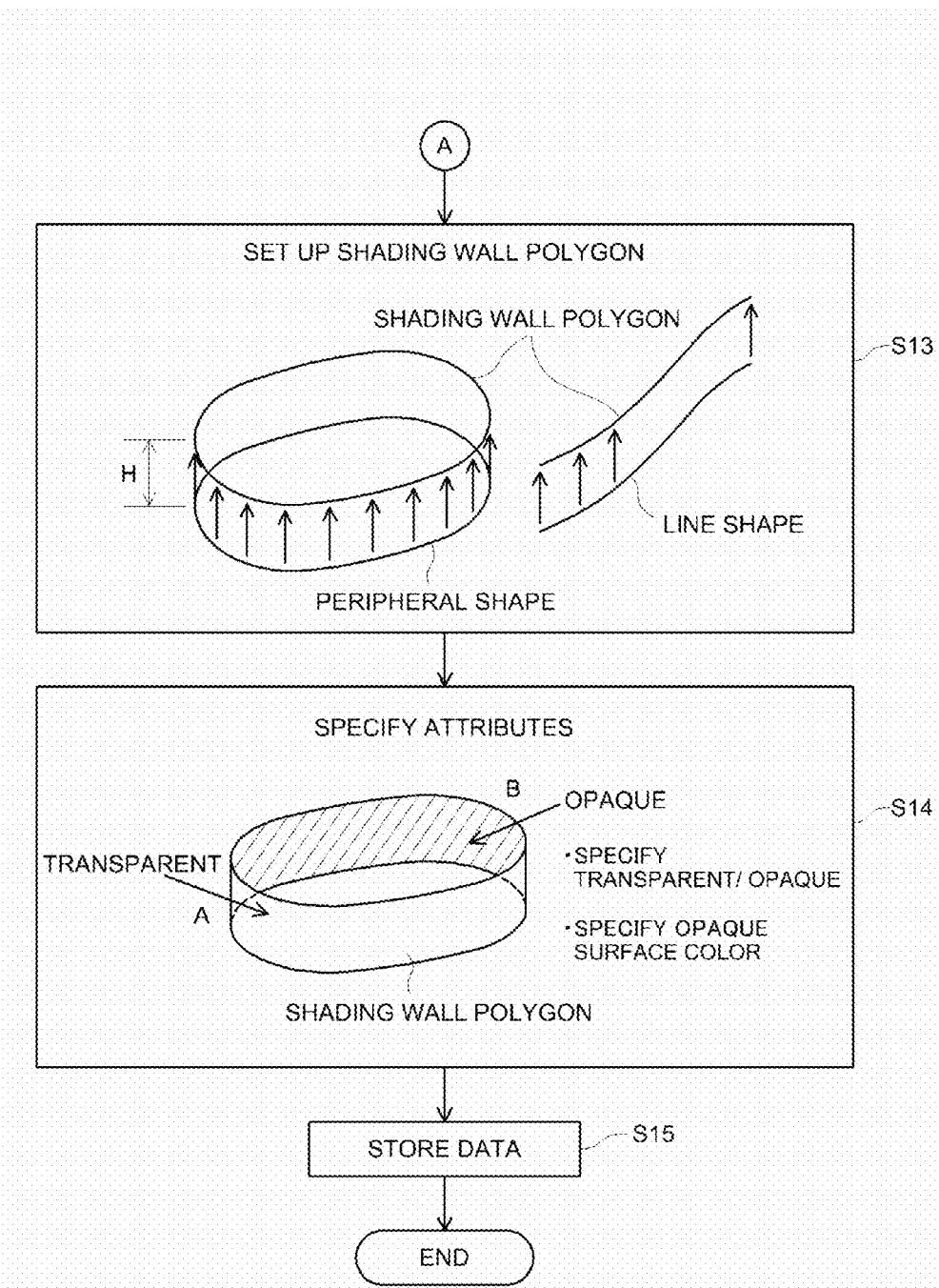
FIG. 6 is a flowchart (2) showing the shading wall polygon generating process.

FIGS. 5 and 6 are flowcharts of the shading wall polygon generating process. This shading wall polygon generating process is mainly performed by the shading wall polygon generator 102 and is performed by the CPU of the map data generation device 100 as the hardware configuration.

When the shading wall polygon generating process is triggered, the map data generation device 100 reads original map data (step S10). The map data generation device 100 subsequently inputs a location where a shading wall polygon is to be set (step S11). The location may be set, for example, by specifying a boundary polygon or by specifying a line shape. The boundary polygon indicates a feature polygon, for example, the river polygon or the pond polygon shown in FIG. 3, as the object where a shading wall is to be set around its outer periphery.

The specification of a boundary polygon may be performed individually by the operator or may be performed automatically, for example, based on the type of a feature polygon. The type of a feature polygon for which a shading wall polygon is to be set may be specified in advance: for example, water system such as river or pond (excluding the sea) or a semi-subterranean road. At step S11, the map data generation device 100 selects a boundary polygon according to this specification.

The specification of a line shape is employed to set a shading wall polygon at a location other than the boundary of a polygon as illustrated in FIGS. 4A through 4C. According to this embodiment, the operator manually and individually specifies a line shape. When patterning is allowed for setting a shading wall polygon as illustrated in FIGS. 4A through 4C, the pattern may be used to readily specify a line shape. For example, a pattern of sidewalk may be provided in advance. After selection of a road for which a shading wall polygon is to be set, selection of the pattern "sidewalk" enables the shape of a shading wall polygon to be automatically set at a predetermined position from the edge of the road.

When a boundary polygon is specified, the map data generation device 100 subsequently specifies a peripheral shape of the boundary polygon (step S12). Due to limitations of the graphics library, a polygon is defined as a set of triangles. In order to specify the location where a shading wall polygon is to be set, there is a need to specify the outer periphery of the boundary polygon consisting of triangles.

A procedure of specifying the peripheral shape is shown in the illustration. It is here assumed that there are a triangle polygon POL1 consisting of vertices P11, P12 and P13 and a triangle polygon POL2 consisting of vertices P21, P22 and P23. The map data generation device 100 first selects an arbitrary vertex as a starting point. For example, it is assumed that the vertex P11 is selected.

The map data generation device 100 subsequently moves along a side of the polygon including the selected vertex to search for a next vertex. A direction according to the direction of a normal vector is set for each side of a polygon. The search for a next vertex is thus along the direction set for the side. In the illustrated example, the vertex P12 is searched as the next vertex.

The map data generation device 100 repeats the same series of operations. When a side to be moved along is shared with an adjacent polygon, the map data generating device 100 shifts to the adjacent polygon. In the illustrated example, a side from the vertex P12 to the next vertex P13 is shared with a side of connecting the vertex P23 with the vertex P21 in the adjacent polygon POL2. The map data generation device 100 accordingly shifts from the vertex P12 to the vertex P21 of the adjacent polygon POL2 and repeats the same series of operations. The vertices P12 and P21 are treated as different points in the configuration of polygons but are actually points having identical coordinate values, since there is no gap between the polygons POL1 and POL2. After shifting to the vertex P21, the map data generation device 100 performs the same series of operations to successively search for the vertices P22 and P23. As a result of this process, the peripheral shape of the vertices P11, P12 (P21), P22 and P23 (P13) is specified.

Referring to FIG. 6, the map data generation device 100 sets up a shading wall polygon (step S13). An example of setting up is illustrated. A side face generated by translating the peripheral shape specified at step S12 or the line shape specified at step S11 by a height H in the vertical direction is set as a shading wall polygon. The height H of setting up affects the width of shading in projection display. An increase in height H increases the width of shading and thereby enhances the visibility. An excessive height H, however, provides a feeling of strangeness. A decrease in height H, on the contrary, weakens the stereoscopic effect by shading, and a further decrease in height H makes the shading unrecognizable. The height H is set by taking into account these phenomena.

After determining the shape of the shading wall polygon, the map data generation device 100 specifies attributes (step S14). Specification of the attributes according to this embodiment includes specification of transparent/opaque and specification of the opaque surface color.

Specification of transparent/opaque denotes specifying which of the surfaces of a shading wall polygon to be transparent and is synchronous with specification of a normal vector of the shading wall polygon. In the illustrated example, a shading wall polygon is set as a closed surface with specifying the outside of the shading wall polygon to be transparent and the inside to be opaque. The transparent/opaque specification may be individually performed by the operator or may be performed automatically for a closed shape, based on previous patterning such as to be set the inside of the shape to be opaque. A similar procedure may be employed to set up the line shape to specify a shading wall polygon.

Specification of the opaque surface color denotes specifying the color of the surface of the shading wall polygon, which is specified as the surface to be opaque. The shading wall polygon is used to provide shading, so that the color may be set to, for example, black or gray. A variety of colors, for example, brown color having the low lightness than the color representing earth may be selected according to the location where the shading wall polygon is set. A texture to be applied to the opaque surface may additionally be specified. Upon completion of generation of the shading wall polygon by the above series of processing, the map data generation device 100 stores the generated shading wall polygon into the drawing map database (step S15) and terminates the process.

D. Map Display Process

Figure 7:
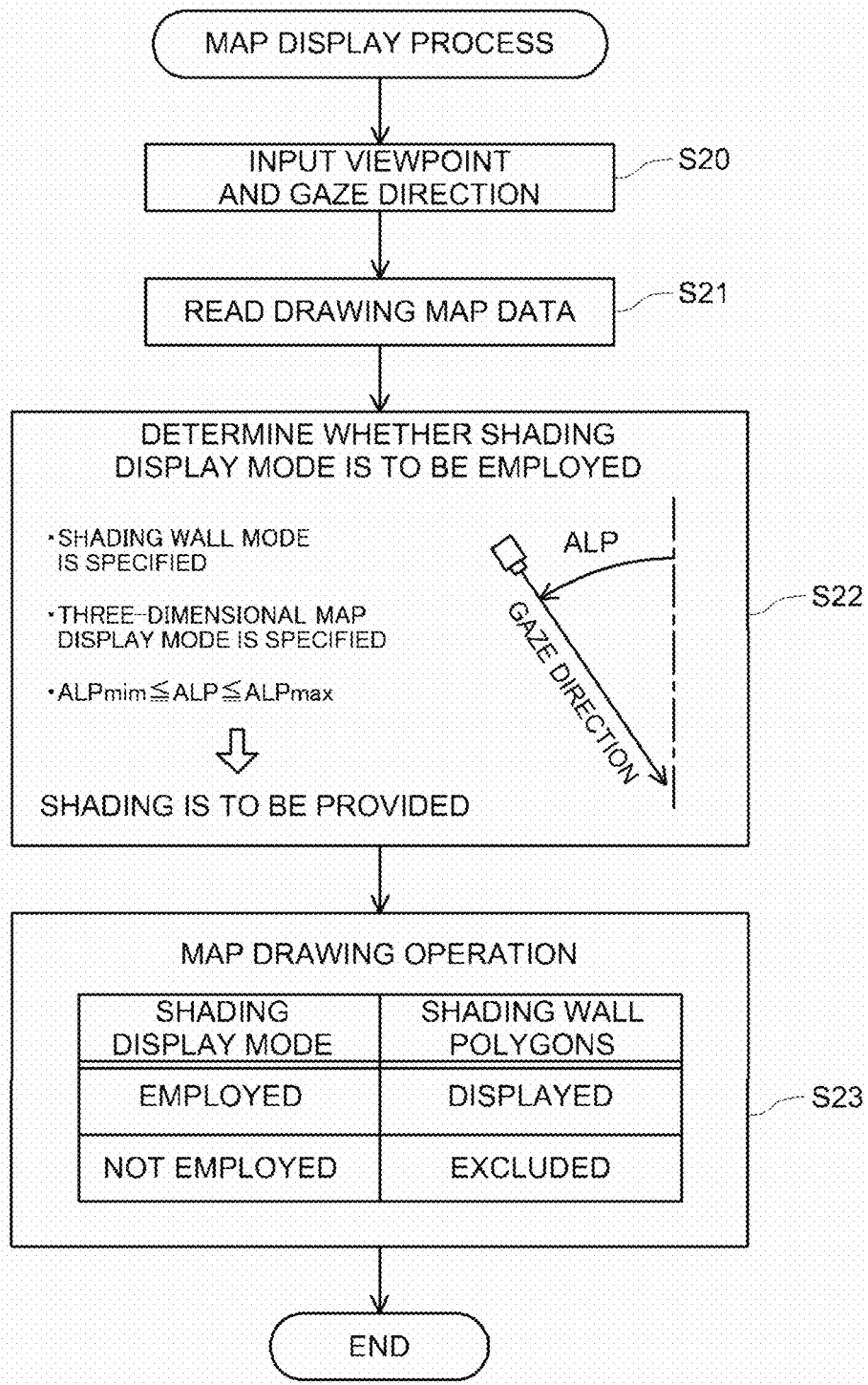
FIG. 7 is a flowchart showing a map display process.

The following describes a process of displaying a map using the shading wall polygons set as described above. FIG. 7 is a flowchart showing a map display process. This process may be used in the course of route guidance after a route search or may be used to display a map independently of a route search. This process is mainly performed by the display controller 306 of the terminal 300 and is performed as the hardware configuration by the CPU of the terminal 300.

When the map display process is triggered, the terminal 300 inputs a viewpoint and a gaze direction (step S20) and reads drawing map data based on the input viewpoint and gaze direction (step S21). The procedure of the embodiment first refers to the map information storage 305 and, when the data are insufficient, downloads required data from the server 200.

The terminal 300 subsequently determines whether a shading display mode is employed (step S22). The shading display mode denotes a display mode that provides shading by using shading wall polygons. Since this embodiment provides shading (FIGS. 1A and 1B) in a simulative manner, shading may cause an unnatural display according to the gaze direction. The terminal 300 accordingly determines whether shading is to be provided, based on the display conditions, especially the gaze direction. The determination of step S22 may be omitted, and the shading display mode may be employed unconditionally.

The conditions for employing the shading display mode are illustrated. The first condition is that the user specifies a shading wall mode. When the user does not desire to provide shading, there is no need to employ the shading display mode. The second condition is that a three-dimensional display mode is specified. Shading is provided to give the stereoscopic effect to a three-dimensional map. There is no need to employ the shading display mode in the case of specifying two-dimensional display. The third condition is that an angle ALP of the gaze direction to the vertical direction is equal to or greater than a predetermined minimum value ALPmin and is equal to or less than a predetermined maximum value ALPmax. The map approaches to two-dimensional display with a decrease in angle ALP. When the angle ALP is less than the minimum value ALPmin, shading is not effectively provided, so that the shading display mode is not employed. In the case of a large angle ALP, on the other hand, the gaze direction approaches to the horizon and makes the display not with a bird's eye view illustrated in FIGS. 1A and 1B but with a driver's view. In this state, shading wall polygons are likely not to be visually recognized as shadings but to be visually recognized as walls.

The embodiment accordingly does not employ the shading display mode in the case of a large angle ALP. In this manner, the embodiment sets the limits with respect to the gaze direction to employ the shading display mode. The limit values ALPmin and ALPmax may be selected arbitrarily to avoid unnatural display as described above. The embodiment employs the shading display mode when all the above three conditions are satisfied. The conditions of determination are not limited to these conditions, but only part of these conditions may be used or other conditions may be added.

Upon completion of the above processing, the terminal 300 projects the drawing map data to perform a map drawing operation (step S23). When the shading display mode is employed, shading wall polygons are displayed in the map drawing operation. Otherwise, shading wall polygons are excluded from the display objects. The process of displaying the shading wall polygon draws only the surface specified to be opaque, in order to display the map with shading as illustrated in FIGS. 1A and 1B. Drawing no surface specified to be transparent prevents a feeling of strangeness from being provided in the displayed map. Shading walls may be displayed, while being generated.

The foregoing describes the embodiment of the invention. The invention may not necessarily include all the variety of specific features described above in Embodiment 1, but may be implemented with partial omission of such specific features or with combinations of such specific features as appropriate.

The invention may be implemented by a variety of modifications, other than embodiment described above. For example, parts configured by the hardware in the embodiment may be implemented by the software configuration, and vice versa. The embodiment describes the configuration of displaying a map on the display 300d of the terminal 300, but the invention is also applicable to a configuration of printing a map with a printer or the like.

The embodiment describes the configuration that shading wall polygons are generated in advance by the map data generation device 100. A modification may display a map while appropriately generating shading wall polygons. This modification is implemented, for example, by providing the server 200 with the shading wall polygon generator 102 of the map data generation device 100.

The embodiment describes the configuration where a shading wall polygon is set vertically on the feature polygon surface. The shading wall polygon may otherwise be set to be inclined to the vertical direction.

The invention is applicable to improve the reality in display of a three-dimensional map.

What is claimed is:

1. A three-dimensional map display system that displays a three-dimensional map, the system comprising:
a drawing map database that is used to draw the three-dimensional map; and
a display controller that refers to the drawing map database and displays the three-dimensional map as a bird's eye view from a viewpoint position looking down from a height in a gaze direction,
wherein the drawing map database includes:
feature polygon data for feature polygons representing shapes of features to be drawn in the three-dimensional map; and
shading wall polygon data for shading wall polygons so as to provide shading in the three-dimensional map, each of the shading wall polygons being a virtual plate-like polygon having a first surface and a second surface opposite to the first surface, the plate-like polygon being arranged perpendicular to or inclined to a feature polygon, only one of the first and second surfaces being set to be visible while the other being set to be transparent,
and wherein the display controller displays only the one of the first and second surfaces which is set to be visible as the shading wall polygon in the three-dimensional map.

2. The three-dimensional map display system according to claim 1, wherein the shading wall polygon is set along a boundary of the feature polygon.

3. The three-dimensional map display system according to claim 2,
wherein the feature polygon data includes first and second feature polygons which are drawn such that the first feature polygon is overlaid on the second feature polygon in a vertical direction whereas the first feature polygon is lower than the second feature polygon in an actual height relationship, and
wherein the shading wall polygon is set along a boundary of the first feature polygon, and an inner surface of the shading wall polygon facing the first feature polygon is specified to be visible.

4. The three-dimensional map display system according to claim 1, wherein the plate-like polygon is arranged so as to rise upward from the corresponding feature polygon to have a specified height above the corresponding feature polygon.

5. A map data generation device that generates a drawing map database to display a three-dimensional map, the map data generation device comprising:
an original map database that stores feature polygon data for feature polygons representing shapes of features to be displayed in the three-dimensional map; and
a shading wall polygon generator that generates virtual shading wall polygons to provide shading in the three-dimensional map, the shading wall polygon generator being configured to:
extract a boundary of a feature polygon stored in the original map database;
generate a virtual plate-like shading wall polygon to be arranged vertical to or inclined to the boundary, the shading wall polygon having a first surface and a second surface oppose to the first surface, only one of the first and second surfaces being set to be visible in the three-dimensional map while the other being set to be transparent; and
store the generated shading wall polygon in the drawing map database.

6. The map data generation device according to claim 5, wherein the feature polygon data includes first and second feature polygons which are drawn such that the first feature polygon is overlaid on the second feature polygon in a vertical direction whereas the first feature polygon is located under the second feature polygon in an actual height relationship, and wherein the shading wall polygon generator arranges the shading wall polygon along a boundary of the first feature polygon and set an inner surface of the shading wall polygon facing the first feature polygon to be visible.

7. A map data generation method performed by a computer to generate a drawing map database to display a three-dimensional map, the map data generation method comprising:

reading feature polygon data from an original map database to draw feature polygons representing shapes of features to be displayed in the three-dimensional map; and generating virtual shading wall polygons to provide shading in the three-dimensional map, wherein the generating the shading wall polygons comprises:

extracting a boundary of a feature polygon stored in the original map database;

generating a virtual plate-like shading wall polygon to be arranged perpendicular to or inclined to the boundary, the shading wall polygon having a first surface and a second surface opposite to the first surface, only one of the first and second surfaces is set to be visible in the three-dimensional map while the other is transparent; and storing the generated shading wall polygon in the drawing map database.

8. The map data generation method according to claim 7, wherein the feature polygon data includes first and second feature polygons which are drawn such that the first feature polygon is overlaid on the second feature polygon in a vertical direction whereas the first feature polygon is located under the second feature polygon in an actual height relationship, and wherein the generating the virtual shading wall polygons includes:

setting the shading wall polygon along a boundary of the first feature polygon and specifying an inner surface of the shading wall polygon facing the first feature polygon to be visible while an outer surface of the shading wall polygon facing the second feature polygon to be transparent.

9. The map data generation method according to claim 7, wherein the plate-like polygon is arranged so as to rise upward from the corresponding feature polygon to have a specified height.

10. A non-transitory computer readable media storing a computer program that causes a computer to generate a drawing map database for a three-dimensional map, the computer program causing the computer to implement:

a function of reading feature polygon data from an original map database to draw feature polygons representing shapes of features to be displayed in the three-dimensional map; and a shading wall polygon generating function of generating virtual shading wall polygons to provide shading in the three-dimensional map, the shading wall polygon generating function comprises:

extracting a boundary of a feature polygon stored in the original map database;

generating a virtual plate-like shading wall polygon to be set perpendicular to or inclined to the boundary, the shading wall polygon having a front surface and a rear surface, only one of the first and second surfaces being set to be visible in the three-dimensional map and the other being set to be transparent; and storing the generated shading wall polygon in the drawing map database.

11. The non-transitory computer readable media according to claim 10, wherein the feature polygon data includes first and second feature polygons which are drawn such that the first feature polygon is overlaid on the second feature polygon in a vertical direction whereas the first feature polygon is located under the second feature polygon in an actual height relationship, and wherein the shading wall polygon generating function further includes:

setting the shading wall polygon along a boundary of the first feature polygon and specifying an inner surface of the shading wall polygon facing the first feature polygon to be visible while an outer surface of the shading wall polygon facing the second feature polygon to be transparent.

12. The non-transitory computer readable media according to claim 10, wherein the plate-like polygon is arranged so as to rise upward from the corresponding feature polygon to have a specified height.

\* \* \* \* \*